(12) United States Patent
Park et al.

(10) Patent No.: US 11,459,441 B2
(45) Date of Patent: Oct. 4, 2022

(54) THERMOSETTING COMPOSITE RESIN COMPOSITION HAVING SUPERIOR SURFACE SMOOTHNESS AND MECHANICAL PROPERTIES AND METHOD OF MANUFACTURING AUTOMOBILE SHELL PLATE USING SAME

(71) Applicants: Hyundai Motor Company, Seoul (KR); Kia Motors Corporation, Seoul (KR); Hanwha Q CELLS & Advanced Materials Corporation, Sejong (KR)

(72) Inventors: Sang Sun Park, Gyeonggi-do (KR); Seong Muk Lee, Gyeonggi-do (KR); Se Yong Kim, Sejong (KR); Ki Young Kim, Sejong (KR); Hyeon Kyu Lee, Sejong (KR)

(73) Assignees: Hyundai Motor Company, Seoul (KR); Kia Motors Corporation, Seoul (KR); Hanwha Q CELLS & Advanced Materials Corporation, Sejong (KR)

( * ) Notice: Subject to any disclaimer, the term of this patent is extended or adjusted under 35 U.S.C. 154(b) by 415 days.

(21) Appl. No.: 16/567,832

(22) Filed: Sep. 11, 2019

(65) Prior Publication Data
US 2020/0377687 A1 Dec. 3, 2020

(30) Foreign Application Priority Data
Jun. 3, 2019 (KR) ........................ 10-2019-0065245

(51) Int. Cl.
| | | |
|---|---|---|
| C08K 3/26 | (2006.01) | |
| C08K 3/013 | (2018.01) | |
| C08F 283/01 | (2006.01) | |
| C08L 67/06 | (2006.01) | |
| C08L 75/04 | (2006.01) | |
| B29K 67/00 | (2006.01) | |
| C08K 7/14 | (2006.01) | |

(52) U.S. Cl.
CPC ............ *C08K 3/013* (2018.01); *C08F 283/01* (2013.01); *C08K 3/26* (2013.01); *C08L 67/06* (2013.01); *C08L 75/04* (2013.01); *B29K 2067/06* (2013.01); *C08F 2800/20* (2013.01); *C08J 2300/22* (2013.01); *C08J 2300/24* (2013.01); *C08K 7/14* (2013.01); *C08K 2003/265* (2013.01)

(58) Field of Classification Search
CPC . C08K 3/013; C08K 3/26; C08K 7/14; C08K 2003/265; C08K 2003/222; C08K 3/22; C08K 5/54; C08K 7/28; C08K 9/06; C08K 2003/2227; C08F 283/01; C08F 2800/20; C08L 67/06; C08L 76/04; C08L 67/00; C08L 2205/03; C08L 2205/035; C08L 23/0853; C08L 63/00; C08L 2666/06; C08L 2666/20; C08L 2666/22; B29K 2067/06; C08J 2300/22; C08J 2300/24; C08J 5/043; C08J 5/10; B29C 43/006; B29C 70/18
USPC .......................................... 524/494
See application file for complete search history.

(56) References Cited

U.S. PATENT DOCUMENTS

| | | | |
|---|---|---|---|
| 9,068,075 B2 * | 6/2015 | Park ...................... C08L 53/00 | |
| 2002/0042468 A1 * | 4/2002 | Choi ...................... C08K 7/14 | |
| | | | 524/494 |
| 2003/0065057 A1 | 4/2003 | Choi et al. | |
| 2003/0134925 A1 * | 7/2003 | Guzauskas ............ C08L 51/003 | |
| | | | 522/71 |
| 2003/0199625 A1 | 10/2003 | Twardowska et al. | |
| 2005/0143533 A1 * | 6/2005 | Raviola .................. C08L 67/06 | |
| | | | 525/445 |
| 2008/0090954 A1 * | 4/2008 | Sumner .................. C08L 67/06 | |
| | | | 524/500 |
| 2008/0187718 A1 * | 8/2008 | Takano .................. C08G 59/56 | |
| | | | 428/147 |
| 2016/0229990 A1 * | 8/2016 | Du ...................... C08G 59/245 | |

FOREIGN PATENT DOCUMENTS

| | | |
|---|---|---|
| KR | 20020089632 A | 11/2002 |
| WO | 2019/023301 A1 | 1/2019 |

* cited by examiner

*Primary Examiner* — Hannah J Pak
(74) *Attorney, Agent, or Firm* — Fox Rothschild LLP

(57) ABSTRACT

Disclosed is a thermosetting composite resin composition including a thermosetting resin, particularly an unsaturated polyester resin, a low-profile additive and an inorganic filler, and to a method of manufacturing an automobile shell plate using the same. The thermosetting composite resin composition can be used to manufacture not only automobile shell plates having low specific gravity and superior surface smoothness and mechanical properties but also structural parts such as interior parts for airplanes or railways.

14 Claims, No Drawings

THERMOSETTING COMPOSITE RESIN COMPOSITION HAVING SUPERIOR SURFACE SMOOTHNESS AND MECHANICAL PROPERTIES AND METHOD OF MANUFACTURING AUTOMOBILE SHELL PLATE USING SAME

CROSS REFERENCE TO RELATED APPLICATION

The present application claims priority based on Korean Patent Application No. 10-2019-0065245, filed on Jun. 3, 2019, the entire content of which is incorporated herein for all purposes by this reference.

TECHNICAL HELD

The present invention relates to a thermosetting composite resin composition including a thermosetting resin, particularly an unsaturated polyester resin, a low-profile additive and an inorganic filler, and to a method of manufacturing an automobile shell plate using the same.

BACKGROUND OF THE INVENTION

Generally, an automobile shell plate includes a piece of gel-coated fiber-reinforced plastic molded from a thermosetting resin composition through a hand lay-up process, and due to the characteristics of the method and material thereof, it is difficult to attain uniform quality, discoloration may occur, and poor rigidity may result.

In the related arts, a sheet-molding-compound (SMC) molding process has been applied these days, in lieu of hand lay-up. The SMC molding process is a process including impregnating a thermosetting resin composition comprising an unsaturated polyester resin, a curing agent and typical additives with glass fiber, followed by heating and pressing with a hydraulic press.

Meanwhile, in molded articles produced through the SMC molding process, for example, automobile shell plates and the like, in addition to properties such as mechanical strength, and the like, the demand for weight reduction (low specific gravity) has recently increased due to global environmental problems. In order to realize such weight reduction, for example, a method of decreasing the amount of filler or glass fiber contained in the SMC may be performed. However, when the amount of filler or glass fiber is decreased, the resulting molded article has greatly reduced mechanical strength. In addition, although a method of incorporating a hollow filler, such as Shirasu balloons or glass balloons, into a fiber-reinforced molding material is known to realize weight reduction, only the addition of the hollow filler to the fiber-reinforced molding material makes it impossible to attain good moldability. Furthermore, the surface smoothness of the molded article may decrease, thus deteriorating the outer appearance, and moreover, the mechanical strength of the molded article may be decreased, thereby making it difficult to apply a fiber-reinforced molding material containing the hollow filler to structural parts such as interior parts for airplanes or railways, the bodies of which are critically required to be lightweight.

Therefore, it is necessary to use SMC materials having all of a low specific gravity, mechanical properties equal to or superior to those of general SMC, and high surface smoothness.

SUMMARY OF THE INVENTION

In preferred aspects, provided are a thermosetting composite resin composition having low specific gravity and superior mechanical properties and surface smoothness and a method of manufacturing an automobile shell plate using the same.

The preferred aspects of the present invention are not limited to the foregoing, and will be able to be clearly understood through the following description and to be realized by the means described in the claims and combinations thereof.

In one aspect, provided is a thermosetting composite resin composition, comprising: a thermosetting resin; a low-profile additive (LPA); and an inorganic filler.

The term "thermosetting resin" as used herein refers to a polymer (e.g., an adhesive, an unsaturated polymer, or a polymer component that can be hardened, polymerized, cross-linked or solidified by curing (e.g., heat or light (UV) radiation, high pressure, or a curing agent such as a catalyst). Examples of the thermosetting resin suitably may include polyester resin, polyurethanes, polyurea, polyurea/polyurethane hybrids, vulcanized rubber, epoxy resin, or combinations thereof. Preferred thermosetting resins may have a weight average molecular weight of from about 7,800 to about 9,000 daltons, or particularly from about 8,200 to about 8,700 daltons. Preferred thermosetting resins suitably may have a polydispersity from about 2.4 to about 3.3, or particularly from about 2.8 to about 3.0.

The term "low-profile additive" as used herein refers to a saturated thermoplastic resin, which may be softened or unhardened when heat is applied or a surrounding temperature rises and may be hardened when it is cooled. In certain embodiments, the low-profile additive may be added to a thermosetting resin to have improved surface smoothness because, for example, these low-profile additives may reduce or eliminate the amount of shrinkage that occurs during the cure of the thermosetting resin (e.g., unsaturated polyester resin). Examples of the low-profile additive (e.g., thermoplastic) that may be suitably incorporated into the thermosetting resin may include saturated polyester, polyacrylate (including poly(methacrylate) or other substituted acrylates), polyvinyl acetate (PVAc), polyurethane (PU) and the like. Preferred low-profile additives may have a weight average molecular weight of from about 22,000 to about 32,000 daltons, or particularly from about 25,000 to about 29,000 daltons. Preferred low-profile additives suitably may have a polydispersity from about 4.3 to about 5.3, or particularly from about 4.5 to about 5.0.

The term "inorganic filler" as used herein refers to a material including at least an inorganic compound that includes metal or non-carbon elements, which may be added to or incorporated into a matrix (e.g., polymer matrix), without changing properties of the matrix or reacting with the components in the matrix, in order to provide additional properties (e.g., mechanical properties, density or behavior). Examples of the inorganic filler may include glass (e.g., glass bubbles), calcium carbonate ($CaCO_3$), and aluminum hydroxide ($Al(OH)_3$), kaolin, talc, wollastonite, metal fillers, or the like.

It should be understood that a thermosetting resin, low profile additive and organic filler in a composition will be distinct materials. For instance, those components may not be covalently linked, i.e. the thermosetting resin, low profile additive and organic filler are separate and distinct components. The thermosetting resin and low profile additive also may each comprise different types of polymer linkages, for example in a suitable composition the thermosetting resin may comprise polyester linkages and substantially minimal or no (less than 10, 8, 6, 5, 4, 3, 2 or 1 weight percent based on total weight of the thermosetting resin) polyacrylate or polyvintylacetate linkages, wherein the same composition a low profile additive may comprise polyacrylate linkages and substantially minimal or no (less than 10, 8, 6, 5, 4, 3, 2 or 1 weight percent based on total weight of the low profile additive) polyester linkages.

In certain aspects, a thermosetting resin suitably may comprise an unsaturated functionality, e.g. a multiple (such as double) carbon-carbon bond, while the low profile additive will be substantially unsaturated and for example will have substantially minimal or no as discussed above multiple carbon-carbon bonds.

The thermosetting composite resin composition may further include a thickening agent and a fibrous reinforcement.

The thermosetting composite resin composition may suitably include an amount of about 22 to 28 wt % of the thermosetting resin, an amount of about 10 to 15 wt % of the low-profile additive, 30 to 35 wt % of the inorganic filler, an amount of about 0.7 to 1.5 wt % of the thickening agent, and an amount of about 28 to 37 wt % of the fibrous reinforcement, all the wt % are based on the total weight of the thermosetting composite resin composition.

The thermosetting resin may suitably include an unsaturated polyester resin, which may include a polymer of a glycol and an acid. The glycol may suitably include one or more propylene glycol, neopentyl glycol and combinations thereof.

The thermosetting resin may suitably include a polymer of propylene glycol, neopentyl glycol and an acid. For example, a weight ratio of the propylene glycol, the neopentyl glycol and the acid may be suitably about 2.5 to 4.5:1:4.5 to 6.5.

The thermosetting resin may suitably include an unsaturated polyester resin having a degree of unsaturation of about 47 to 50%.

The low-profile additive may include epoxy and one or more selected from the group consisting of saturated polyester, polyvinyl acetate (PVAc), and polyurethane (PU).

The inorganic filler may be surface-treated with a silane compound.

The silane compound may suitably include one or more selected from the group consisting of ester-silane, aminosilane, and methacryl-silane.

The inorganic filler may suitably include one or more selected from the group consisting of glass bubbles, calcium carbonate ($CaCO_3$), and aluminum hydroxide ($Al(OH)_3$).

The inorganic filler may suitably have a compressive strength of about 6000 to 6300 psi.

The thermosetting composite resin composition may further include an additive including a dispersant, a separation inhibitor and combinations thereof.

The thickening agent may include a magnesium oxide (MgO). The magnesium oxide may suitably be in a form of powder or paste.

In an aspect, provided is a method of manufacturing an automobile shell plate. The method may include: forming a sheet using the thermosetting composite resin composition as described herein and pressing the sheet through molding.

The automobile shell plate may suitably have a specific gravity of about 1.27 to 1.37.

The automobile shell plate may suitably have a tensile strength of about 65 to 90 MPa.

The automobile shell plate may suitably have a tensile modulus of about 8.0 to 9.0 GPa.

The automobile shell plate may suitably have an elongation of about 1.35 to 1.5%.

The automobile shell plate may suitably have a flexural strength of about 180 to 200 MPa.

The automobile shell plate may suitably have a flexural modulus of about 8.5 to 10 GPa.

The automobile shell plate may suitably have a long-term waviness (LTW) of about 8 to 15.

The term "long-term waviness" or "waviness" as used herein refers to a measurement of a surface texture in a wide range of spaced component thereon. Typically the long-term waviness can be measured using a wave scan of the surface and/or by calculating from roughness, depths variations of valleys and peaks of the surfaces, and/or elevated height of the surfaces.

In an aspect, provided is an automobile shell plate manufactured by the method described herein.

Further provided is a vehicle including the automobile shell plate as described herein.

Other aspects of the invention are disclosed infra.

According to the present invention, a thermosetting composite resin composition can be used to manufacture not only automobile shell plates having low specific gravity and superior surface smoothness and mechanical properties but also structural parts such as interior parts for airplanes or railways.

The effects of the present invention are not limited to the foregoing, and should be understood to include all effects that can be reasonably anticipated from the following description.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurements that essentially occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In one aspect, provided is a thermosetting composite resin composition may include a thermosetting resin, a low-profile additive (LPA) and an inorganic filler. The thermosetting composite resin composition may further include a thickening agent and a fibrous reinforcement.

The thermosetting composite resin composition may suitably include an amount of about 22 to 28 wt % of the thermosetting resin, an amount of about 10 to 15 wt % of the low-profile additive, an amount of about 30 to 35 wt % of the inorganic filler, an amount of about 0.7 to 1.5 wt % of the thickening agent and an amount of about 28 to 37 wt % of the fibrous reinforcement, all the wt % based on the total weight of the thermosetting composite resin composition.

Unless otherwise indicated, it is to be stated in advance that the amount of each component of the thermosetting composite resin composition described below is based on total weight of the thermosetting composite resin composition. If the criterion for determining the amount thereof is changed, the new criterion will always be specified, and thus those skilled in the art will be able to clearly understand the criterion on which the amount is based.

(1) Thermosetting Resin

The thermosetting resin may be a main component for the thermosetting composite resin composition, and any thermosetting resin may be used without limitation and may include any material it has a fast reaction time, low price, superior mechanical properties and high surface smoothness.

The thermosetting resin may include unsaturated polyester, epoxy, phenol, and the like, and preferably includes an unsaturated polyester resin, which may include a polymer of glycol and acid. Here, the unsaturated polyester resin may have a degree of unsaturation of about 47 to 50%. The glycol may include propylene glycol, neopentyl glycol and combinations thereof.

The thermosetting resin may suitably include a polymer of propylene glycol, neopentyl glycol and acid. For example, when the neopentyl glycol is used as the glycol, the flowability of the thermosetting composite resin composition and the surface of a product derived therefrom may be improved.

The weight ratio of propylene glycol to neopentyl glycol to acid may suitably be about 2.5 to 4.5:1:4.5 to 6.5. Here, when the weight ratio of these components is within the above range, the flowability and the surface quality of the thermosetting composite resin composition may be substantially improved, for example, due to the neopentyl glycol.

The amount of the thermosetting resin may be suitably of about 22 to 28 wt % based on the total weight of the thermosetting composite resin composition. When the amount thereof is less than about 22 wt % or greater than about 28 wt % based on the total weight of the thermosetting composite resin composition, mechanical properties and strength may deteriorate.

(2) Low-Profile Additive

The low-profile additive is not limited, and may include any material capable of reducing shrinkage when the thermosetting composite resin composition of the present invention is cured, relieving inherent stress, decreasing microcracks, and increasing surface smoothness.

The low-profile additive may suitably include a thermoplastic homopolymer or copolymer such as polystyrene, polymethyl methacrylate, polyvinyl acetate, and the like, and may preferably include an epoxy-modified low-profile additive. For example, epoxy and one or more selected from the group consisting of saturated polyester, polyvinyl acetate (PVAc), and polyurethane (PU) may be chemically bonded with each other.

Particularly, the low-profile additive in which the epoxy and the polymer such as the saturated polyester described above are chemically bonded may be suitably used, thereby greatly increasing the impact strength of a product made using the thermosetting composite resin composition.

The amount of the low-profile additive may be suitably of about 10 to 15 wt % based on the total weight of the thermosetting composite resin composition. When the amount thereof is less than about 10 wt % or greater than about 15 wt % based on the total weight of the thermosetting composite resin composition, mechanical properties and strength may deteriorate.

(3) Inorganic Filler

The inorganic filler is not limited, and may include any material capable of controlling the specific gravity, surface smoothness, strength, flame retardancy and shrinkage rate of the product.

The inorganic filler may suitably include calcium carbonate as a nonfunctional filler, and may suitably include glass bubbles or calcium carbonate ($CaCO_3$) as a functional filler. Preferably, the inorganic filler may be surface-treated with a silane compound in order to prevent damage upon compounding and molding and to protect the outer appearance, thereby increasing capability of binding to the resin to thus enhance strength. The compressive strength of the inorganic filler surface-treated with the silane compound may fall in the range of about 6000 to 6300 psi, and the silane compound may suitably include one or more selected from the group consisting of ester-silane, amino-silane, and methacryl-silane. For example, the glass bubbles may be surface-treated with ester-silane, similar to the component of the main resin.

Particularly, the inorganic filler, having a compressive strength of about 6000 psi or greater, particularly of about 5900 to 6300 psi, may be used, whereby a thermosetting composite resin composition is not damaged upon compounding and/or molding. Accordingly, the appearance of the product is greatly improved.

Moreover, the present invention is characterized in that the inorganic filler surface-treated with the silane compound is used to thus increase the capability of binding between the inorganic filler and other components, particularly a thermosetting resin, thereby greatly enhancing the strength of products derived from the thermosetting composite resin composition.

The amount of the inorganic filler may be suitably of about 10 to 15 wt % based on the total weight of the thermosetting composite resin composition. When the amount thereof is less than about 10 wt % or greater than about 15 wt % based on the total weight of the thermosetting composite resin composition, mechanical properties and strength may deteriorate.

(4) Fibrous Reinforcement

The fibrous reinforcement is not limited, and may include any material capable of exhibiting superior mechanical properties and dimensional stability. The fibrous reinforcement may suitably include carbon fiber, boron fiber, glass fiber, and the like, and may suitably include glass fiber, which generates economic benefits and has superior mechanical properties and dimensional stability.

The amount of the fibrous reinforcement may suitably be of about 28 to 37 wt % based on the total weight of the thermosetting composite resin composition. When the amount thereof is less than about 28 wt % or greater than about 37 wt % based on the total weight of the thermosetting composite resin composition, mechanical properties and strength may deteriorate.

(5) Thickening Agent

The thickening agent is not limited, and may include any material capable of increasing the properties of the thermosetting composite resin composition, such as precipitation prevention or flow prevention, and the consistency thereof to thus form the liquid resin into a semisolid resin to thereby improve workability. The thickening agent may suitably include MgO, Mg(OH)$_2$, CaO, Ca(OH)$_2$, and the like, and preferably includes a magnesium oxide (MgO) that is able to facilitate the formation of a semisolid resin. For example, the magnesium oxide may be in a form of powder or paste.

The amount of the thickening agent may preferably be of about 0.7 to 1.5 wt % based on the total weight of the thermosetting composite resin composition.

(6) Additive

The additive is not limited, and may include any material capable of imparting the thermosetting composite resin composition with various functionalities, such as improvement in dispersibility and separation prevention. The thermosetting composite resin composition may further include an additive depending on the functions required thereof, and preferably may suitably include a dispersant, a separation inhibitor, and the like.

EXAMPLE

A better understanding of the present invention will be given through the following examples, which are merely set forth to illustrate the present invention but are not to be construed as limiting the present invention.

Example

A thermosetting composite resin composition was prepared using components in the amounts shown in Table 1 below. The thermosetting resin was a polyester resin having a degree of unsaturation of 50% resulting from polymerizing propylene glycol, neopentyl glycol and an acid at a weight ratio of 4:1:5, a low-profile additive was a product resulting from chemically bonding epoxy and saturated polyester, polyvinyl acetate, polyurethane or combinations thereof, and an inorganic filler was glass bubbles having a compressive strength of 6000 to 6300 psi resulting from surface-treating calcium carbonate ($CaCO_3$) with ester-silane at a weight ratio of 100:1.

Moreover, a thickening agent was an MgO powder (MgO paste), a fibrous reinforcement was glass fiber for typical SMC cut to a length of 25.4 mm, and as additives, a dispersant and a separation inhibitor were used at a weight ratio of 1:1.

Comparative Example 1

A thermosetting composite resin composition was prepared using the same components and the same specific gravity as in Example, with the exception that the amount of the resin was increased, the amount of the low-profile additive was decreased, the amount of the filler was decreased and the amount of the reinforcement was increased.

Comparative Example 2

A thermosetting composite resin composition was prepared using the same components and the same specific gravity as in Example, with the exception that the amount of the resin was decreased, the amount of the low-profile additive was increased, the amount of the filler was increased and the amount of the reinforcement was decreased.

Comparative Example 3

A thermosetting resin composition was prepared using 4.2 wt % of an unsaturated polyester resin-1 (OS-108, available from Aekyung Chemical), 5.0 wt % of an unsaturated polyester resin-2 (OS-980, available from Aekyung Chemical), 6.0 wt % of a crystalline unsaturated polyester resin (C772, available from Scott Bader, UK) and 1.5 wt % of a monomer (styrene). The low-profile additive was LPV-40, and the inorganic filler was Scotchlite Glass Bubble K-37 (bulk density=0.37, available from 3M).

Furthermore, the thickening agent was calcium oxide (CaO), and as the fibrous reinforcement, roving-type glass fiber (RS4800-433, available from Owens-Corning Korea) was cut to a length of 2.54 mm and used, and as additives, 0.5 wt % of an initiator (t-butyl perbenzoate) and 1.0 wt % of a release agent (zinc stearate) were used.

Comparative Example 4

A thermosetting composite resin composition was prepared using the same components in the same amounts as in Comparative Example 3, with the exception that different components were used for the thermosetting resin and the low-profile additive. The thermosetting resin was a polyester resin having a degree of unsaturation of 50% resulting from polymerizing propylene glycol, neopentyl glycol and an acid at a weight ratio of 4:1:5, and the low-profile additive was saturated polyester.

Comparative Example 5

A thermosetting composite resin composition was prepared using the same components in the same amounts as in Comparative Example 3, with the exception that different components were used for the thermosetting resin, the low-profile additive and the inorganic filler. The thermosetting resin was a polyester resin having a degree of unsaturation of 50% resulting from polymerizing propylene glycol, neopentyl glycol and an acid at a weight ratio of 4:1:5, the low-profile additive was saturated polyester, and the inorganic filler was glass bubbles having a compressive strength of 6000 to 6300 psi resulting from surface-treating calcium carbonate ($CaCO_3$) with ester-silane at a weight ratio of 100:1.

SMC (a specific gravity of 1.85 to 1.95), as well as a low specific gravity of 1.8 or less, similar to conventional low-specific-gravity SMC (Comparative Examples 3 to 5); and

TABLE 1

| | Example | Comparative Example 1 | Comparative Example 2 | Comparative Example 3 | Comparative Example 4 | Comparative Example 5 |
|---|---|---|---|---|---|---|
| Thermosetting resin [wt %] | 23 | 28 | 20 | 26 | 26 | 26 |
| Low-profile additive [wt %] | 8 | 5 | 13 | 10.5 | 10.5 | 10.5 |
| Inorganic filler [wt %] | 30 | 25 | 38 | 26 | 26 | 26 |
| Thickening agent [wt %] | 1 | 1 | 1 | 1 | 1 | 1 |
| Fibrous reinforcement [wt %] | 35 | 38 | 25 | 35 | 35 | 35 |
| Additive [wt %] | 3 | 3 | 3 | 1.5 | 1.5 | 1.5 |
| Total | 100 | 100 | 100 | 100 | 100 | 100 |

Test Example

The results of evaluation of test specimens manufactured from the thermosetting composite resin compositions of Example and Comparative Examples are shown below.

iii) a long-term waviness (LTW) of 10, thus exhibiting superior surface quality compared to conventional low-specific-gravity SMC (Comparative Examples 3 to 5) in which LTW is difficult to maintain at 30 or less.

TABLE 2

| Items | Unit | Example | Comparative Example 1 | Comparative Example 2 | Comparative Example 3 | Comparative Example 4 | Comparative Example 5 |
|---|---|---|---|---|---|---|---|
| Specific gravity[1] | — | 1.35 | 1.36 | 1.35 | 1.35 | 1.27 | 1.28 |
| G/F content[2] | % | 35 | 28 | 38 | 35 | 35 | 35 |
| Tensile strength[3] | MPa | 90 | 56 | 76 | 68 | 52 | 64 |
| Tensile modulus[4] | GPa | 8.6 | 7.9 | 7.7 | — | 5.9 | 5.4 |
| Elongation[5] | % | 1.4 | 1.2 | 1.3 | — | 1.1 | 1.3 |
| Flexural strength[6] | MPa | 200 | 170 | 175 | 156 | 143 | 152 |
| Flexural modulus[7] | GPa | 9.8 | 8.1 | 7.2 | 10 | 7.3 | 6.8 |
| Long-term waviness[8] | — | 10 | 35 | 15 | — | 32 | 28 |

Note)
[1] Specific gravity: ASTM D792
[2] G/F content: self-measurement (washing with sulfuric acid aqueous solution after combustion)
[3] Tensile strength: ASTM D638
[4] Tensile modulus: ASTM D638
[5] Elongation: ASTM D638
[6] Flexural strength: ASTM D790
[7] Flexural modulus: ASTM D790
[8] Fong-term waviness (LTW): BYK Wave Scan DOI As is apparent from Table 2, the test specimen manufactured using the thermosetting composite resin composition of Example had:

i) a specific gravity of 1.35, which corresponds to a low specific gravity of 1.8 or less, similar to conventional low-specific-gravity SMC (Comparative Examples 3 to 5), such that the low specific gravity is capable of reducing the weight by 30 to 40% compared to an existing steel hood and by 10% compared to an aluminum hood;

ii) a tensile strength of 90 MPa and a flexural strength of 200 MPa, corresponding to mechanical properties (change rate ≤5%) very similar to those of general-specific-gravity Briefly, the test specimen manufactured using the thermosetting composite resin composition of Example according to the present invention had a low specific gravity of 1.8 or less similar to conventional low-specific-gravity SMC, superior mechanical properties very similar to those of general-specific-gravity SMC, and low long-term waviness.

In contrast, Comparative Example 1 exhibited a tensile strength of 90 MPa or less, a tensile modulus of 8.6 Gpa or less, an elongation of 1.4% or less, a flexural strength of 200 Mpa or less and a flexural modulus of 9.8 Gpa or less. Accordingly, it can be confirmed that the mechanical properties were inferior compared to Example, and in particular, the LTW was 30 or more and thus surface smoothness was deteriorated compared to the other Comparative Examples.

Comparative Example 2 exhibited a tensile strength of 90 MPa or less, a tensile modulus of 8.6 Gpa or less, an elongation of 1.4% or less, a flexural strength of 200 Mpa or less and a flexural modulus of 9.8 Gpa or less. Accordingly, it can be confirmed that the mechanical properties were inferior compared to Example, but the LTW was 30 or less, and thus surface smoothness was good.

Comparative Example 3 is a technology corresponding to the background art, and it can be confirmed that when the specific gravity is reduced, mechanical properties are typically decreased. Compared to Example of the present invention, a tensile strength of 90 MPa or less, a tensile modulus of 8.6 Gpa or less, an elongation of 1.4% or less, a flexural strength of 200 Mpa or less and a flexural modulus of 9.8 Gpa or less were exhibited, indicating that the specific gravity was similar to that of Example but that the mechanical properties were low.

Comparative Example 4 exhibited a tensile strength of 90 MPa or less, a tensile modulus of 8.6 Gpa or less, an elongation of 1.4% or less, a flexural strength of 200 Mpa or less and a flexural modulus of 9.8 Gpa or less. Accordingly, it can be confirmed that the mechanical properties were inferior compared to Example, and the LTW was 30 or more and thus surface smoothness was deteriorated compared to the other Comparative Examples.

Comparative Example 5 exhibited a tensile strength of 90 MPa or less, a tensile modulus of 8.6 Gpa or less, an elongation of 1.4% or less, a flexural strength of 200 Mpa or less and a flexural modulus of 9.8 Gpa or less. Accordingly, it can be confirmed that the mechanical properties were inferior compared to Example, and the LTW was close to 30 and thus surface smoothness was deteriorated compared to the other Comparative Examples. In particular, in Comparative Example 5, when the amount of the filler was greatly reduced, the composition balance was varied, indicative of low mechanical properties.

Therefore, according to the various exemplary embodiments of the present invention, it is possible to obtain an automobile shell plate, in which weight reduction can be realized due to the low specific gravity, mechanical performance required for the function as a structural material and mechanical properties necessary for crash performance can be ensured, and surface smoothness suitable for the appearance required of parts for automobile shell plates can be attained.

Although the exemplary embodiments of the present invention have been described with reference to the accompanying drawings, those skilled in the art will appreciate that the present invention may be embodied in other specific forms without changing the technical spirit or essential features thereof. Thus, the exemplary embodiments described above should be understood to be non-limiting and illustrative in every way.

What is claimed is:

1. A thermosetting composite resin composition, comprising:
   about 22 to 28 wt % of a thermosetting resin, wherein the thermosetting resin comprises an unsaturated polyester comprising a polymer of a glycol and an acid, and having a degree of unsaturation of about 47 to 50%;
   about 10 to 15 wt % of a low-profile additive (LPA) comprising epoxy and one or more selected form the group consisting of saturated polyester, polyvinyl acetate (PVAc) and polyurethane (PU); and
   about 30 to 35 wt % of an inorganic filler comprising one or more selected from the group consisting of glass bubbles, calcium carbonate ($CaCO_3$) and aluminum hydroxide ($Al(OH)_3$),
   wherein the inorganic filler has a compressive strength of about 6000 to 6300 psi, wherein the inorganic filler is surface-treated with a silane compound selected from the group consisting of ester-silane, amino-silane, and methacryl-silane, all the wt % based on the total weight of the thermosetting composite resin composition.

2. The thermosetting composite resin composition of claim 1, further comprising:
   a thickening agent; and
   a fibrous reinforcement.

3. The thermosetting resin composite resin of claim 2, wherein the thickening agent is present in an amount of 0.7 to 1.5 wt % and the fibrous reinforcement is present in an amount of about 28 to 37 wt %, all the wt % based on the total weight of the thermosetting resin composite resin composition.

4. The thermosetting composite resin composition of claim 1, wherein the glycol comprises propylene glycol, neopentyl glycol or combinations thereof.

5. The thermosetting composite resin composition of claim 4, wherein the thermosetting resin comprises a polymer of propylene glycol, neopentyl glycol and an acid, and
   a weight ratio of the propylene glycol, the neopentyl glycol and the acid is about 2.5 to 4.5: 1: 4.5 to 6.5.

6. The thermosetting composite resin composition of claim 1, further comprising an additive comprising a dispersant, a separation inhibitor or combinations thereof.

7. The thermosetting composite resin composition of claim 2, wherein the thickening agent comprises a magnesium oxide (MgO), wherein the magnesium oxide is in a form of powder or paste.

8. The thermosetting composite resin composition of claim 2, wherein the fibrous reinforcement comprises a glass fiber.

9. A method of manufacturing an automobile shell plate, comprising:
   forming a sheet using the thermosetting composite resin composition of claim 1; and
   pressing the sheet through molding.

10. The method of claim 9, wherein the automobile shell plate has a specific gravity of about 1.27 to 1.37.

11. The method of claim 9, wherein the automobile shell plate has a tensile strength of 65 to 90 MPa, a tensile modulus of 8.0 to 9.0 GPa, an elongation of 1.35 to 1.5%, a flexural strength of 180 to 200 MPa, or a flexural modulus of 8.5 to 10 GPa.

12. The method of claim 9, wherein the automobile shell plate has a long-term waviness (LTW) of 8 to 15.

13. An automobile shell plate manufactured by the method of claim 9.

14. A vehicle comprising the automobile shell plate of claim claim 13.

* * * * *